US006731286B2

(12) United States Patent
Ritter

(10) Patent No.: US 6,731,286 B2
(45) Date of Patent: May 4, 2004

(54) DATA COMPACTION FOR FAST DISPLAY

(75) Inventor: Gilles Ritter, Ollon (CH)

(73) Assignee: LeCroy Corporation, Chestnut Ridge, NY (US)

( * ) Notice: Subject to any disclaimer, the term of this patent is extended or adjusted under 35 U.S.C. 154(b) by 188 days.

(21) Appl. No.: 10/013,567

(22) Filed: Dec. 11, 2001

(65) Prior Publication Data

US 2003/0107574 A1 Jun. 12, 2003

(51) Int. Cl.[7] .......................... G06T 11/20; G09G 5/22
(52) U.S. Cl. .......................... 345/440; 345/440.1
(58) Field of Search .......................... 345/440, 440.1, 345/555, 428; 382/232, 236

(56) References Cited

U.S. PATENT DOCUMENTS 4,829,293 A * 5/1989 Schlater .................. 345/440.1
5,255,365 A 10/1993 Hungerbuhler
5,434,593 A * 7/1995 Lecklider et al. ........... 345/440
5,550,963 A * 8/1996 Siegel et al. ................ 345/440
5,677,714 A * 10/1997 Klassen et al. ................ 347/9
6,125,201 A * 9/2000 Zador ......................... 382/166
6,222,521 B1 * 4/2001 Ivers et al. ................ 345/440
6,310,979 B1 * 10/2001 Persiantsev et al. ........ 382/236

* cited by examiner

*Primary Examiner*—Michael Razavi
*Assistant Examiner*—Faranak Fouladi
(74) *Attorney, Agent, or Firm*—Frommer Lawrence & Haug LLP; William S. Frommer; Gordon Kessler

(57) ABSTRACT

A method for displaying a compacted data signal, comprising the steps of acquiring a data signal comprising a plurality of data values; computing a compaction table based upon said acquired data signal; generating a min/max pair for all data values of said data signal associated with each of a plurality of vertical pixel columns of a display device; drawing a single vertical line for each min/max pair; and repeating said acquiring, computing, generating and drawing steps for each data signal acquisition.

23 Claims, 5 Drawing Sheets

DATA COMPACTION FOR FAST DISPLAY

BACKGROUND OF THE INVENTION

The recent evolution of various electronics technologies now allows instruments to measure input data signals that are extremely large, and comprise a great number of samples. These larger data signals, and the great number of samples associated therewith require more and more memory to record the great amount of data associated therewith. In addition to merely storing this extensive amount of data in memory, this data must be somehow displayed to let the user analyze the input and sampled data signal.

A conventional procedure for drawing a signal on a screen is to draw a line joining each pair of sample points representing the captured signal. After connection of all of the data points a continuous line is presented to the user as an approximation of the received and sampled signal. While this method works fine with a small number of data sample points, as soon as the number of data points increases, this method becomes very slow. This is because drawing of each line by the display device requires hardware access from the main processor to the display device that is a very slow operation as compared to the processor capability. The most advanced instruments can now acquire multiple millions of samples. However, displaying millions of samples by drawing millions of lines between these samples is a very slow process, and can take up to several seconds.

SUMMARY OF THE INVENTION

In accordance with the invention, in order to avoid the problem of such a slow display, it is desirable to reduce to a minimum the number of times the display device is accessed. Therefore, in accordance with the invention, stored data is compacted before being forwarded to the display. Such a compaction may be performed when the number of data sample values is greater than the horizontal number of pixels of the display device. In such a situation, because the number of data sample values is greater than the number of pixels that can be displayed, multiple data values would "hit" and be displayed at the same vertical pixel column, resulting in a difficult to view display. This is because multiple lines will be drawn overlapping each other vertically along the same pixel column.

Therefore, in accordance with the invention a compaction algorithm comprises examining every data value that would normally "hit" or be displayed at a common vertical pixel column to determine the minimum and the maximum values of such data. Then using this min/max pair a single vertical line is drawn at the appropriate vertical pixel column to represent all of the data values corresponding to the pixel column, instead of drawing a multitude of overlapped vertical lines. This method is then applied to every vertical pixel column to be displayed on the display device. The invention also comprises the steps necessary to insure that data values are associated with the appropriate vertical pixel column.

In accordance with the invention, a clearer and easier display of an acquired signal is provided. Still other objects and advantages of the invention will in part be obvious and will in part be apparent from the specification and the drawings.

The invention accordingly comprises several steps and the relation of one or more of such steps with respect to each other, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Therefore, in accordance with the invention, an improved method and apparatus for displaying a data signal is provided. Data representing a signal to be displayed is compacted before being forwarded to the display. Without compaction, because the number of data sample values is greater than the number of pixels that can be displayed, multiple data values would be displayed at the same vertical pixel column, resulting in a difficult to view display. This is because lines to connect the multiple data sample points in the same vertical pixel column will be drawn overlapping each other. These multiple lines would therefore overlap each other vertically along the same pixel column.

The compaction algorithm of the invention comprises examining the data sample values that would normally be displayed at a common vertical pixel column to determine a minimum and the maximum value of such data. Using this min/max pair, a single vertical line is then drawn at the appropriate vertical pixel column between the two points, rather than drawing a multitude of overlapped vertical lines between all of the originally presented pixels. This method is then repetitively applied to every vertical pixel column to be displayed on the display device.

In order to implement the compaction algorithm in accordance with the invention, it is first necessary to determine all the data sample values that would be displayed as belonging to the same pixel column. A compaction table is therefore computed that first determines the number of data sample values belong to each vertical pixel column. This procedure may be implemented by dividing the total number of data sample values by the total number of horizontal pixels on the display device. Alternatively, an acquisition time for a data signal may be divided by the number of horizontal pixels in the display device. This result will represent the time portion of the sampled signal that corresponds to each vertical pixel column. The number of data sample values during this determined time period is the number of data sample values that will be associated with each vertical pixel column in the display device.

Then, using this determined compaction table to isolate the data sample values to be associated with a particular vertical pixel column, each data value defined by the compaction table to be associated with the particular vertical pixel column is examined to find the minimum and maximum value among the data sample values. This determined min/max pair is then used to define the ends of a vertical line to be drawn for the particular vertical pixel column. As noted above, this procedure is performed for each vertical pixel column of the display device.

Figure 2:
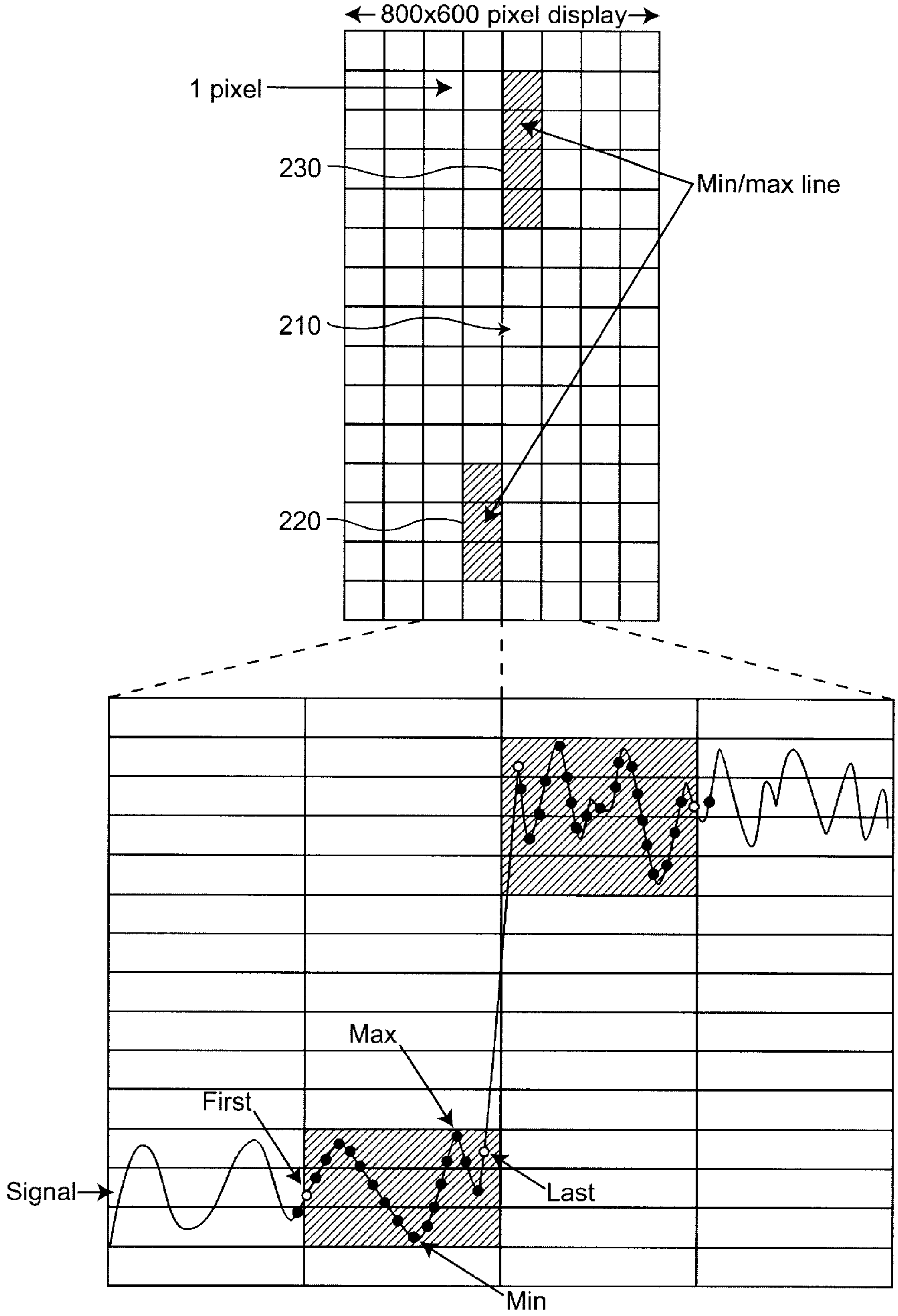
FIG. 2 is a graph depicting an artifact generated by the application of a compaction algorithm in accordance with the invention.

However, the use of this method, called min/max compaction may create, under certain condition, minor artifacts which consist of having some hole between certain drawn min/max lines when the maximum value of a vertical pixel column x is smaller than minimum value of a vertical pixel column x±1 (and for reverse situation where the minimum value of a vertical pixel column x is greater than maximum value of a vertical pixel column x±1). This artifact is depicted in FIG. 2, where a space 210 is shown between vertical lines (220, 230) drawn in adjacent vertical pixel columns.

Figure 3:
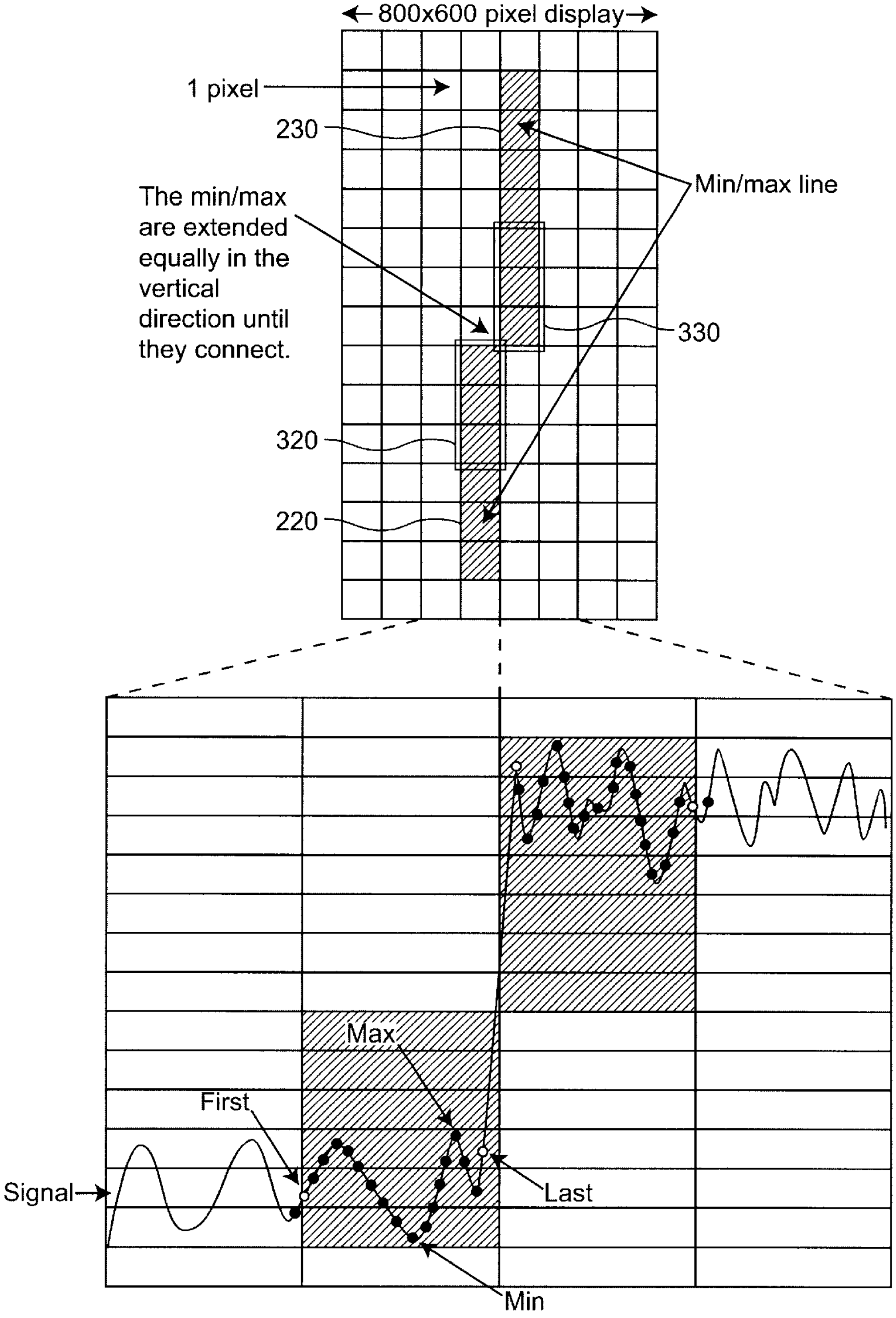
FIG. 3 is a graph depicting a simple method of curing the artifact of FIG. 2.
Figure 4:
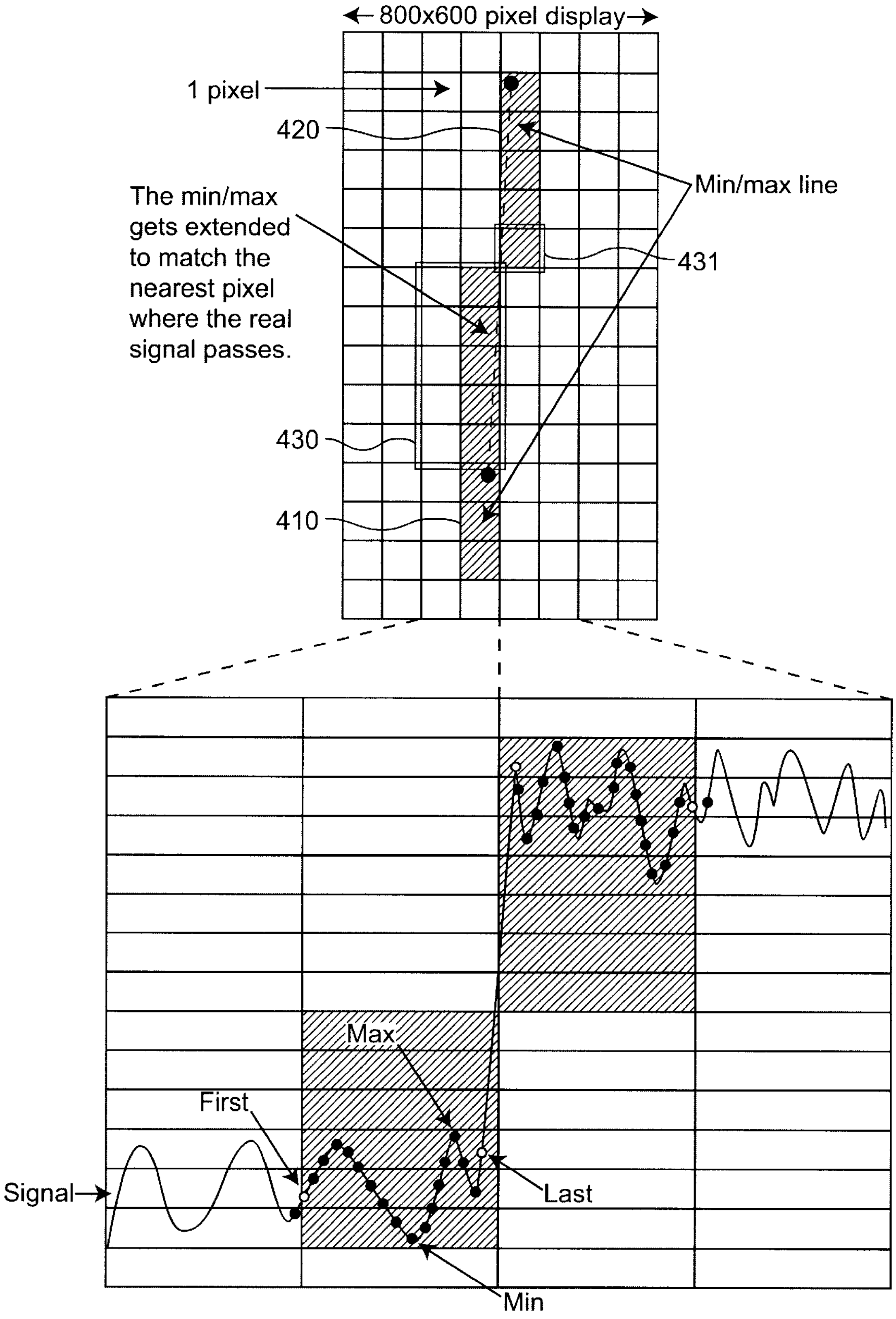
FIG. 4 is a graph depicting a curing of the artifact of FIG. 2 in accordance with the invention.

In a simplified solution to the problem, the two min/max lines are extended symmetrically vertically by extending portions 320, 330 to be joined to fill up the hole, as shown in FIG. 3. This only results in an approximation of reality, because the line joining the last data value of the previous min/max to the first data value of the next min/max may start from the bottom of the previous min/max 410 to the bottom of the next min/max 420, as shown in FIG. 4. In this case, because of the precise location of the min/max pixel values, the middle of a line 430 that would have been drawn without the use of a compaction algorithm to connect these points does not necessarily correspond to the middle of the line drawn using the compaction algorithm employing the nearest value for both the min/max and simply extending each line an equal amount to connect them.

The problem noted above regarding the inability to insure a proper connection between adjacent vertical lines that must be joined to remove any generated artifacts is solved by storing, in addition to the min/max values for each of the vertical pixel columns, the first and last data value corresponding to the same vertical pixel column. Thus, when extending adjacent vertical lines to remove an artifact, the middle of those two values can be used to compute the exact position for joining the disconnected adjacent min/max lines. The connection between the two points is made by extending both adjacent min/max pair to the middle point between the last value of the left (first in time) min/max pair and the first value of the right (next in time) min/max pair. The step where the connection between the two lines occurs is typically not a simple middle point between the two adjacent vertical lines. Thus, as shown in FIG. 4, extended portions 430, 431 of different sizes may be provided to better follow an ideal line.

Figure 1:
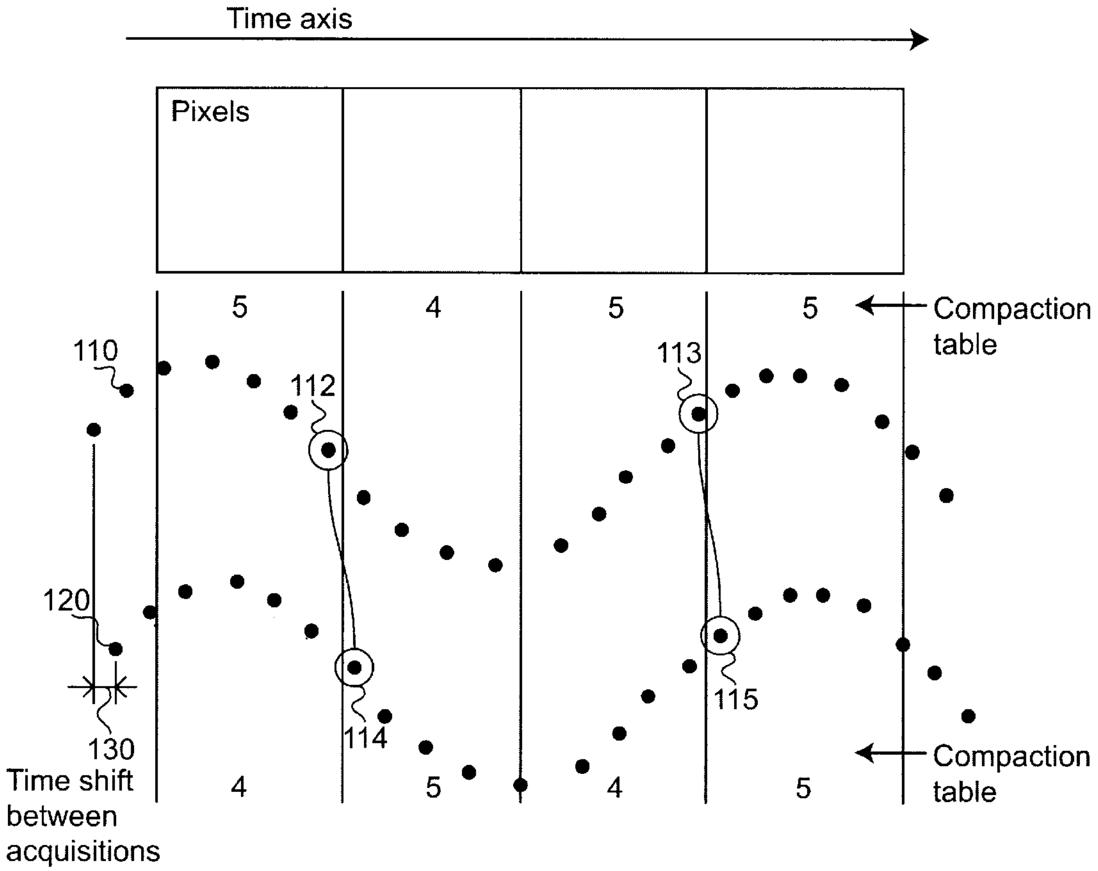
FIG. 1 is a graph depicting time offsets resulting from an acquisition procedure.
Figure 5:
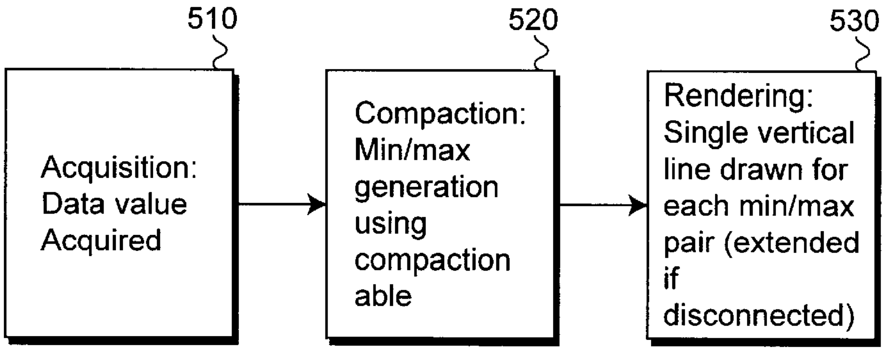
FIG. 5 is a flow chart depicting a simple compaction method utilizing a single compaction table.

In a simpler embodiment, such as the procedure shown in FIG. 5, after data is acquired at step 510, a generated compaction table is used at step 520, and the rendering is drawn at step 530, a single vertical line for each min/max pair. The compaction table is computed only when the number of acquisition data or the display width is changed. Because of the way acquisition hardware works, each acquisition (consecutive or otherwise) does not occur at the exact same time for each sweep. A small arbitrary time offset 130 between the timing of acquisition in a first sweep 110 and the timing of acquisition in a second sweep 120 is shown in FIG. 1. This means the same indexed (numbered) data value may occur at a slightly different time between different acquisition. However, as noted above, each vertical display pixel column represents a fixed range of time that is not designed to vary between acquisitions because the display is provided independently of the timing of the acquisition system. Employing such a variable data acquisition time but fixed display pixel range results in same indexed (numbered) data value possibly corresponding to one vertical pixel column in a first acquisition (112, 113) and corresponding to the adjacent vertical pixel column during the next acquisition (114, 115). The connected circles shown in FIG. 1 indicate this difficulty. With this simplified embodiment, this small time shift between acquisitions is not accounted for, and as a result some data sample values are associated with the wrong vertical pixel column.

As noted above, in the simplified compaction method embodiment, the compaction table is computed only once, using the number of vertical pixel columns and the number of data sample points only. Each pixel was to have a fixed number of data sample points associated therewith (FIG. 1. Example: 5, 4, 5, 5 data sample points for the shown vertical pixel columns). This generic compaction table is then used for all subsequent acquisitions. Because each vertical pixel column on the display represents a period of time that is always the same, using the same compaction table for every acquisition causes some data sample values to be associated with a wrong vertical pixel column (see FIG. 1).

Another problem with the simplified compaction method embodiment comes from the fact that the total number of data sample points is used to compute the compaction table. Thus, looking at FIG. 1, a point to the left of the first pixel and a point to the right of the last pixel are also displayed. This is improper because, these displayed pixels are not within the predetermined time slice the pixels are to represent and the absolute time of the data sample values.

Figure 6:
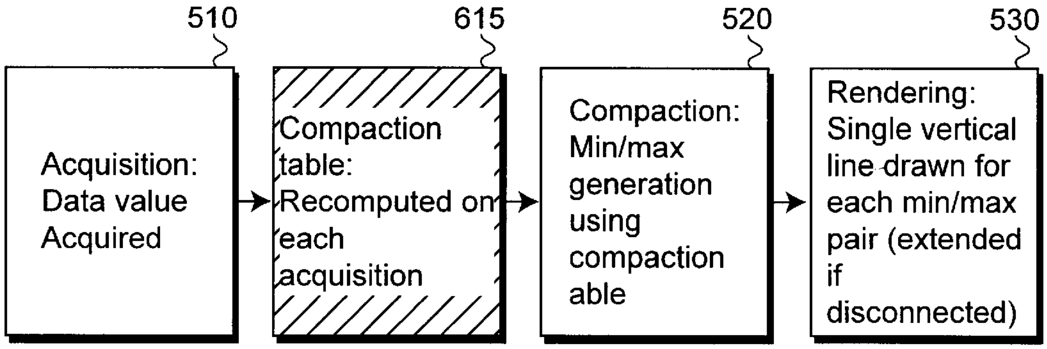
FIG. 6 is a flow chart depicting a compaction method in accordance with the invention in which a compaction table is recomputed for each acquisition.

Therefore, in accordance with the invention, and in an attempt to overcome the drawbacks inherent in the simpler embodiment, as shown in FIG. 6, a compaction table is computed between each acquisition at step 615 in order to account for the small time offset that may be generated between acquisitions. To account for this small time offset, the compaction table no longer relies on the number of data sample values as compared with and the number of display pixel columns. Rather, the compaction table is generated in accordance with the real absolute time of the acquisition of the data sample values including any generated time offset.

Because the compaction table in accordance with the invention is computed for each acquisition, any generated time offset between each acquisition is sure to be accounted for. This in turn insures that all data sample values are associated with the correct pixel for any acquisition. If any generated offset remains the same between two acquisitions, the compaction table need not be recomputed. The major difference between the simpler embodiment and the embodiment of the invention is that the translation from sample index to pixel is performed with computing an absolute horizontal domain and unit (usually time [s]) for the sample indexes instead of using the simple ratio between the number of samples and the number of pixels. Then the corresponding pixel defining the horizontal time range including this absolute horizontal value is selected.

For reasons of enhancing performance, not each data value need to be translated to an absolute value for comparison because this translation is very time consuming. Therefore, to avoid this time-consuming step of translation, the compaction table noted above is computed in advance for each acquisition. The compaction table predetermines a range of sample indexes to be associated with the time range of each pixel, as shown in FIG. 1, but accounts for time offsets by being generated for each acquisition. The generated compaction table therefore consists of a pair of data points representing the first and last sample indexes to be associated with a particular pixel. A compaction table generated for the first waveform in FIG. 1 would be 2–6/7–10/11–15/16–20. The compaction table for the second waveform would be 2–5/6–10/11–14/15–19.

Therefore, in accordance with the invention, more accurate and rapid rendering of a received signal can be achieved.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for displaying a compacted data signal, comprising the steps of:

acquiring a data signal comprising a plurality of data values;

computing a compaction table based upon said acquired data signal for each of a plurality of vertical pixel columns of a display device;

generating a min/max pair for all data values of said data signal associated with each of said plurality of vertical pixel columns, each said min/max pair stored in a compaction table associated with a respective vertical pixel column;

wherein each said compaction table of said plurality of vertical pixel columns further consists of a pair of data points representing a first and a last data value that is associated with a pixel; and wherein a connection between min/max pairs of adjacent vertical pixel columns is made by extending both adjacent min/max pairs and using a middle point of the last and first data values to compute the exact position for connecting the min/max lines;

drawing a single vertical line for each said min/max pair; and repeating said acquiring, computing, generating and drawing steps for each data signal acquisition to compute a new compaction table for each said data signal acquisition in order to account for horizontal trigger offset.

2. The method of claim 1, further comprising the steps of:

determining whether an adjacent pair of min/max pairs includes non-overlapping values; and extending each of said vertical lines of said adjacent pair of min/max pairs to encompass overlapping values.

3. The method of claim 2, further comprising the step of extending each vertical line in accordance with a line drawn between each point of each min/max pair closest to the other of said adjacent min/max pairs.

4. The method of claim 3, wherein said vertical lines are extended unequal amounts in accordance with the location of said min/max points of said adjacent min/max pairs.

5. The method of claim 1, wherein said compaction table comprises an indication of a range of data values associated with each of said plurality of vertical pixel values.

6. The method of claim 5, wherein said data values are associated with a particular vertical pixel value based upon an acquisition time thereof.

7. A method for removing an artifact in a display of a waveform after being compacted in accordance with a compaction algorithm, comprising the steps of:

determining a min/max pair of values for each of a plurality of vertical pixel columns of a display device;

determining between each adjacent pair of min/max pairs whether said min/max values overlap; and extending each adjacent min/max pair an amount in accordance with a line connecting a point of each min/max pair closest to the other of said adjacent min/max pair so that said adjacent min/max pairs have values that overlap.

8. The method of claim 7, wherein said overlapping values are equal.

9. The method of claim 7, wherein said min/max pair comprises a minimum and maximum of a plurality of values of an acquired waveform associated with a particular one of said plurality of vertical pixel columns.

10. An apparatus for displaying a compacted data signal, comprising:

an acquisition module for acquiring a data signal comprising a plurality of data values;

a compaction generator for computing a compaction table based upon said acquired data signal for each of a plurality of vertical pixel columns of a display device;

determining means for generating a min/max pair for all data values of said data signal associated with each of said plurality of vertical pixel columns, each said min/max pair stored in a compaction table associated with a respective vertical pixel column;

wherein each said compaction table of said plurality of vertical pixel columns further consists of a pair of data points representing a first and a last data value that is associated with a pixel; and wherein a connection between min/max pairs of adjacent vertical pixel columns is made by extending both adjacent min/max pairs and using a middle point of the last and first data values to compute the exact position for connecting the min/max lines; and a renderer for drawing a single vertical line for each said min/max pair;

wherein said acquiring, computing, generating and drawing is repeated for each data signal acquisition to compute a new compaction table for each said data signal acquisition in order to account for horizontal trigger offset.

11. The apparatus of claim 10, further comprising:

means for determining whether an adjacent pair of min/max pairs includes non-overlapping values;

wherein said renderer extends each of said vertical lines of said adjacent pair of min/max pairs to encompass overlapping values.

12. The apparatus of claim 11, wherein each vertical line is extended in accordance with a line drawn between each point of each min/max pair closest to the other of said adjacent min/max pairs.

13. The apparatus of claim 12, wherein said vertical lines are extended unequal amounts in accordance with the location of said min/max points of said adjacent min/max pairs.

14. The apparatus of claim 10, wherein said compaction table comprises an indication of a range of data values associated with each of said plurality of vertical pixel values.

15. The apparatus of claim 14, wherein said data values are associated with a particular vertical pixel value based upon an acquisition time thereof.

16. An apparatus for removing an artifact in a display of a waveform after being compacted in accordance with a compaction algorithm, comprising:

determining means for determining a min/max pair of values for each of a plurality of vertical pixel columns of a display device; and discrimination means for determining between each adjacent pair of min/max pairs whether said min/max values overlap;

wherein said renderer extends each adjacent min/max pair an amount in accordance with a line connecting a point of each min/max pair closest to the other of said adjacent min/max pair so that said adjacent min/max pairs have values that overlap.

17. The apparatus of claim 16, wherein said overlapping values are equal.

18. The apparatus of claim 16, wherein said min/max pair comprises a minimum and maximum of a plurality of values of an acquired waveform associated with a particular one of said plurality of vertical pixel columns.

19. The method of claim 1, wherein said compaction table comprises a plurality of compaction intervals associated with each of said plurality of vertical pixel columns wherein:

each of said compaction intervals represent an absolute horizontal range which corresponds to the pixel with which each of said compaction intervals are associated;

each of said compaction intervals comprises an indication of a range of data samples associated with each of said plurality of vertical pixel columns;

a time shift between different acquisitions is computed;

each of said compaction intervals are recomputed on every acquisition; and each of said compaction intervals comprises an arbitrary number of data samples, possibly different data samples between different compaction intervals.

20. The method of claim 19, wherein said horizontal range is time.

21. The method of claim 2, wherein said compaction table is computed in advance of performing the data compaction using the absolute horizontal position of every data sample.

22. The method of claim 2, wherein said compaction table is computed in advance of performing the data compaction in an optimized and faster way using only the horizontal position of the data sample at the edge of every transition between adjacent compaction intervals.

23. The method of claim 5, wherein adjacent pair of min/max are extended unequal amounts in accordance with a line drawn between the last data sample of the left min/max pair and the first data sample of the right min/max pair.

* * * * *